F. HANSON.
Horse Hay-Rake.

No. 217,369. Patented July 8, 1879.

WITNESSES:
Chas. H. Kimball.
Chas. S. Mooney.

INVENTOR:
Freeman Hanson
Per atty
William Henry Clifford.

UNITED STATES PATENT OFFICE.

FREEMAN HANSON, OF HOLLIS, MAINE.

IMPROVEMENT IN HORSE HAY-RAKES.

Specification forming part of Letters Patent No. 217,369, dated July 8, 1879; application filed May 23, 1879.

*To all whom it may concern:*

Be it known that I, FREEMAN HANSON, of Hollis, in the county of York and State of Maine, have invented certain new and useful Improvements in Hay-Rakes; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
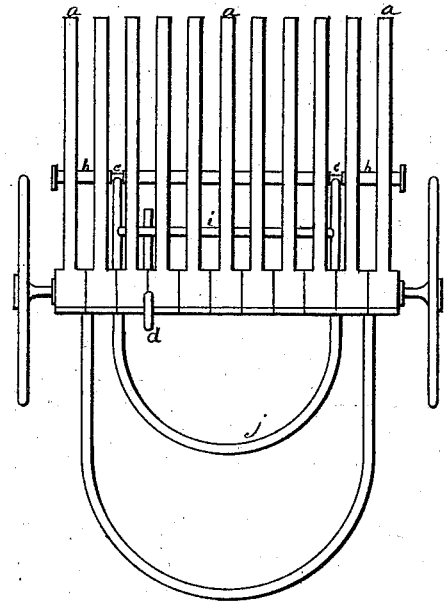
Figure 3:
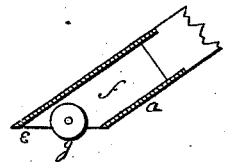
Figure 4:
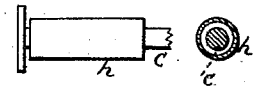
Figure 2:
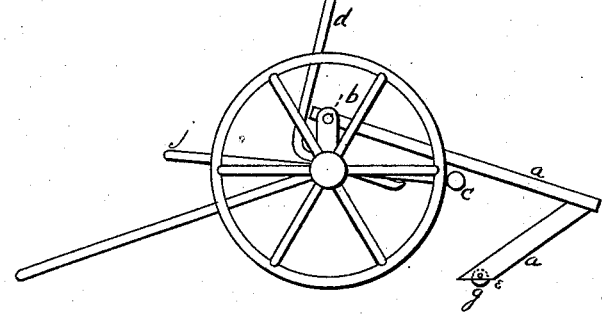

Figure 1 is a top plan. Fig. 2 is a side elevation. Fig. 3 is a section of a tooth, showing the truck. Fig. 4 is an elevation and section, to show the roller by which the teeth are lifted.

Same letters show like parts.

The purpose of my invention is to produce a hay-rake which can be easily discharged of its hay by the raising of the teeth in the common way, and one also which, in passing over the field, is not liable to have the points of its teeth caught or entangled in tufts or bunches, such as are usually found in hay-fields. It has a further object—to prevent the hay from becoming twisted or entangled around the journals of the trucks set into the hollow teeth-points, hereinafter described.

$a$ shows the teeth. They can be moved up and down on the pivot $b$. They can be thus separately moved. The teeth can all be raised together by the bar $c$, acted upon by the lever $d$.

The foregoing devices thus enumerated I do not claim.

I provide the lower ends, $e$, of the teeth with hollow points, (seen at $f$.) These may be bolted to the parts $e$, or attached in any convenient way. They are placed at a proper angle, and so formed on the bottom end as to present a proper surface, and occupy the proper relations to the ground over which they move. Within these hollow points of the teeth I place the trucks or rollers $g$. These trucks have their axes through the sides of the hollow teeth-points. The trucks project sufficiently below the bottom ends of the hollow tooth-points to lift the points and hold them a little above the surface of the ground. Thus, when the rake moves along, the points of the teeth are just removed from contact with the ground. Furthermore, it is manifest that these trucks both diminish friction and very much lessen the liability of the teeth to catch on irregularities, tufts, or bunches on the ground, and by their form rise and roll easily over many inequalities and obstructions into which the tooth-points would otherwise stick.

The trucks or rollers being journaled within the hollow points of the teeth, no hay will accumulate or wind around the journals or trucks. The points of the teeth can be easily so adjusted by practice that they will be near enough to the surface of the ground to take up all the hay, and yet sufficiently removed by the trucks to override many obstructions.

The bar $c$ is fitted with sleeves $h$, which, when the lever $d$ is pushed forward, roll along on the under sides of the teeth $a$ or bars, and thus very much diminish the force necessary to raise all of the teeth in order to discharge them from their accumulation of hay. The lever $d$ is attached to the axle of the machine, so as to turn thereon. It has a horizontal arm extending back and playing under the cross-bar $i$, which is rigidly attached to the yoke $j$, to which the bar is also attached, on which are placed sleeves $h$. The yoke is attached to and turns on the axle of the machine.

What I claim as my invention, and desire to secure by Letters Patent, is—

The rake as herein described, having the teeth $a$, with hollow points $f$, and rollers $g$, journaled within said hollow points, in combination with the pivot $b$, the carriage, the lever $d$, yoke $j$, cross-bar $i$, and sleeves $h$, as herein described.

In testimony that I claim the foregoing as my own I affix my signature in presence of two witnesses.

FREEMAN HANSON.

Witnesses:
OSCAR HILL,
SIMON J. LOCK.